United States Patent [19]

Kraverath

[11] Patent Number: 4,811,431

[45] Date of Patent: Mar. 14, 1989

[54] UNIVERSAL TAIL PIECE FOR INSTALLATION IN A WATER WASTE LINE

[76] Inventor: Robert G. Kraverath, 1311 SW. 83rd Ave., North Lauderdale, Fla. 33068

[21] Appl. No.: 868,435

[22] Filed: May 30, 1986

[51] Int. Cl.$^4$ .............................................. E03C 1/00
[52] U.S. Cl. ...................... 4/191; 137/270; 137/615; 137/873; 285/160; 285/261; 285/266
[58] Field of Search .................... 4/191; 285/261, 266, 285/160, 150-152, 155, 156, 158, 189, 190, 192; 137/270, 615, 616.7, 873, 875, 876, 247.13, 247.25, 247.29, 561 A; 239/587

[56] References Cited

U.S. PATENT DOCUMENTS

| | | | |
|---|---|---|---|
| 115,977 | 6/1871 | Myers, Jr. | 137/873 |
| 253,908 | 2/1882 | Brady | 285/150 |
| 290,196 | 12/1883 | Abel | 285/261 |
| 488,624 | 12/1892 | Brewster | 285/261 |
| 1,559,057 | 10/1925 | Stewart | 239/587 |
| 1,948,220 | 2/1934 | Kennedy | 285/160 |
| 1,950,172 | 3/1934 | Gavaza | 137/270 |
| 2,065,789 | 12/1936 | Bolsinger . | |
| 2,309,786 | 2/1943 | Porter | 285/189 |
| 2,926,527 | 3/1960 | Crandall | 285/151 |
| 3,246,854 | 4/1966 | King, Jr. | 239/587 |
| 3,453,667 | 7/1969 | Politz | 4/295 |
| 3,658,250 | 4/1972 | Cornelius | 239/587 |
| 4,162,546 | 7/1979 | Shortell | 4/191 |
| 4,179,762 | 12/1979 | Barnhardt et al. | 4/191 |
| 4,218,786 | 8/1980 | Taglarino | 4/206 |
| 4,555,820 | 12/1985 | Dragstrem | 4/191 |

FOREIGN PATENT DOCUMENTS

| | | | |
|---|---|---|---|
| 2305676 | 10/1976 | France | 285/189 |
| 103618 | 3/1964 | Norway | 285/155 |
| 576406 | 4/1946 | United Kingdom | 285/155 |

Primary Examiner—Henry J. Recla
Assistant Examiner—Linda J. Sholl
Attorney, Agent, or Firm—Shlesinger & Myers

[57] ABSTRACT

A tail piece for insertion in a waste pipe of a water drainage system including a main tubular portion connected to a waste pipe, tubular branch means having central conduit means connected to the main tubular portion, and means for selectively adapting the tubular branch means for connection to an upwardly extending tube for draining an appliance into a downwardly extending tube for priming a drain trap.

12 Claims, 1 Drawing Sheet

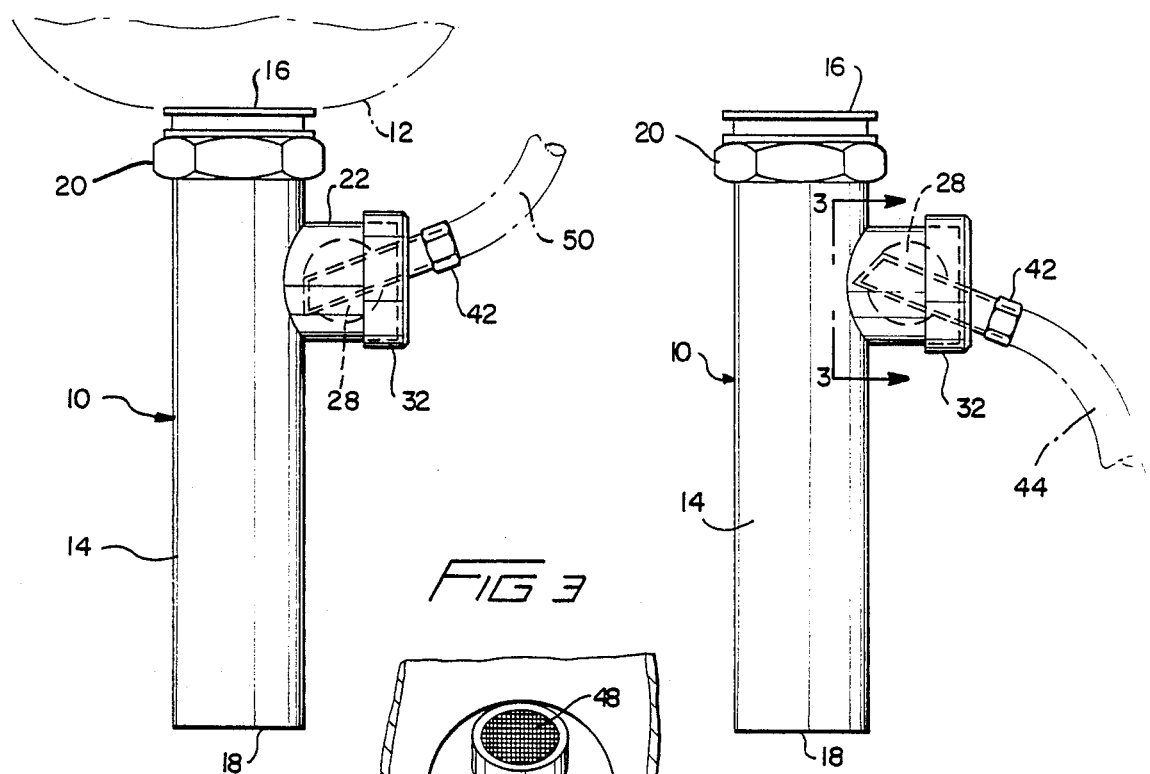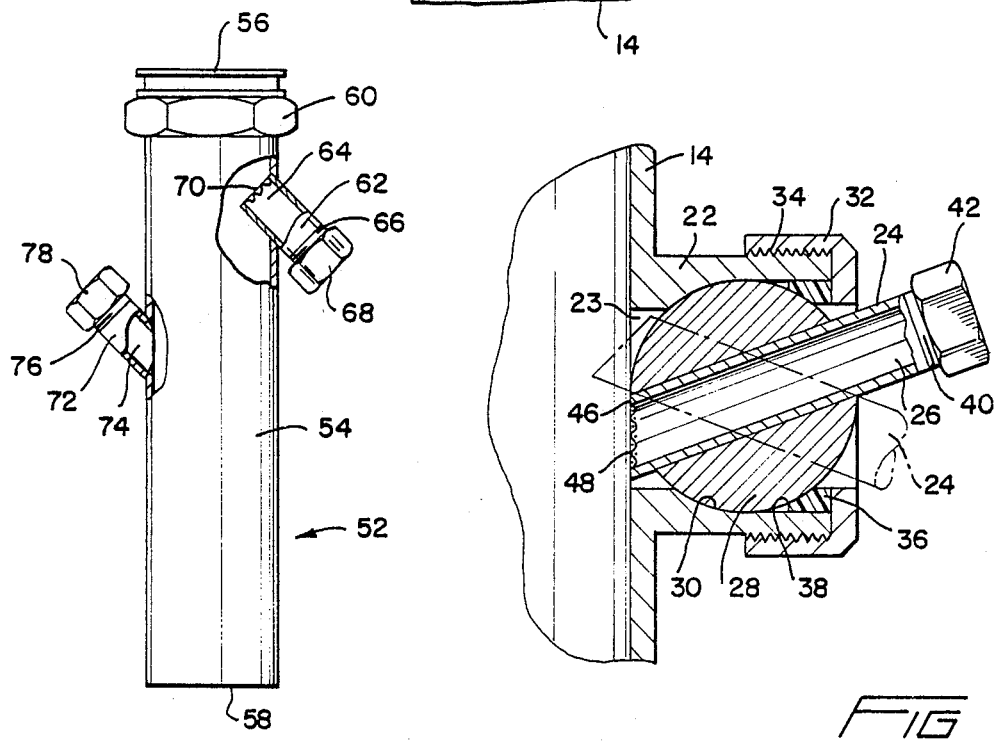

4,811,431

UNIVERSAL TAIL PIECE FOR INSTALLATION IN A WATER WASTE LINE

This invention is a universal tail piece which is selectively useable for different purposes in a water waste line.

BACKGROUND OF THE INVENTION

Tail pieces have been widely used in the plumbing industry for insertion in a waste pipe which conducts waste water to a waste drain. One form of tail piece includes a portion for conducting the waste water from appliances into the waste pipe for delivery to the waste drain system. Another form of tail piece includes a portion which diverts a part of the waste water to a floor drain water trap for priming the latter. Up to the present time, it has been necessary to provide tail pieces which are of different construction, the particular tail piece to be used being determined by the use thereof either as a drain for waste water from appliances or as a primer for a floor drain water trap.

SUMMARY OF THE INVENTION

The present invention is a universal tail piece which selectively serves to receive drain water from appliances and/or divert waste water to a floor drain water trap.

In the preferred form of the present invention, the tail piece includes a main tubular portion which is inserted to a waste water line leading from a sink or the like, and a branch tubular portion extending from, and in communication with, the main tubular portion. The branch portion is joined to the main portion by a universal connection, whereby the branch portion may be oriented upwardly at an acute angle to the main portion thereof to receive drainage from appliances, or oriented downwardly at an acute angle to the main portion for connection to a remote trap.

In another form of the invention, the universal tail piece comprises a main tubular portion inserted in the waste pipe and two tubular branch portions which are fixedly connected to, in communication with the main tubular portion. One of the branch portions extends upwardly at an acute angle to the main tubular portion for receiving drainage from an appliance, and the other tubular portion extends downwardly at an acute angle to the main tubular portion for directing a portion of waste water flowing through the waste pipe and tubular main portion to a floor drain trap.

In both forms of the invention, when employed for feeding water to a trap, a portion of the branch tubular portion extends inwardly of the main tubular portion conduit for positively diverting a portion of the waste water flowing through the waste pipe and the main tubular portion into the trap line, for automatically priming the trap.

DESCRIPTION OF FIGURES OF THE DRAWING

FIG. 1 is a side elevational view of the universal tail piece of the present invention, showing the branch portion thereof in position for draining an appliance;

FIG. 2 is a view similar to FIG. 1, showing the branch portion in position for diverting a portion of the waste water to a floor drain trap;

FIG. 3 is a sectional view taken along the line 3—3 of FIG. 2, looking in the direction of the arrows;

FIG. 4 is an enlarged sectional view of the branch portion of the present invention, showing details of construction; and FIG. 5 is a side elevational view of a modified form of a tail piece, portions thereof being broken away to disclose details of construction.

DESCRIPTION OF THE INVENTION

In FIGS. 1 to 4, there is illustrated the presently preferred form of this invention, wherein the tail piece generally designated 10 is oriented in a substantially vertical position, the upper end of which is connected to the drain of a sink 12 or other receptacle for conducting waste water to a waste pipe (not shown).

Tail piece 10 includes a main tubular portion 14 having a top end 16 and a bottom end 18, the tubular portion providing a conduit through which waste water gravitates to the waste pipe. upper end 16 of conduit 14 is connected to sink 12 or other receptacle by conventional fittings 20.

At a point spaced from the upper end of tubular portion 14, there is provided a tubular boss, enclosure or the like 22 which is at substantially a right angle to, and integral with, main tubular portion 14, and is provided with a central conduit 23 which is in communication with the conduit of main tubular portion 14.

It is a salient feature of the present invention, as shown in FIGS. 1, 2 and 4 to provide a tubular branch portion 24 having a central conduit 26 which is coextensive with its length. As shown to advantage in FIG. 4, tubular branch portion 24 extends diametrically through, and is fixedly engaged with, a ball 28, which ball is seated in a complemental concave portion 30 formed in the inner wall of boss 22. This enables ball 28 and branch portion 24 to be rotated relative to boss 22 and main tubular portion 14.

A locking nut 32 is threadedly engaged with the end of tubular boss 22 as indicated at 34. A portion of the interior wall 36 of locking nut 32 is concave as indicated at 38 for engagement with ball 28, which concave portion, in combination with concave portion 30, form a socket which prevents any lateral movement of the ball, while permitting rotational movement of ball 28, and resultant movement of tubular branch portion 24.

The outer end of tubular branch portion 24 is threaded at 40 for engagement with a hex nut 42. A tubular member 44 may then be connected to hex nut 42 by a conventional compression ring or any other suitable fashion, for delivering fluid through tubular member 44 and branch portion 24 into the conduit of main tubular portion 14.

As shown to advantage in FIGS. 1, 2 and 4, the inner end of tubular branch portion 24 extends slightly beyond ball 28 and end 46 thereof is beveled or tapered inwardly and upwardly with respect to the branch portion as indicated at 46, so that, when the branch portion is inclined downwardly with respect to main tubular portion 14, in order to prime a drain trap, the lower end part of the branch portion extends slightly into the conduit of main tubular portion 14. In this position, the inner end of branch tubular portion 24 serves as a scoop to receive and positively divert a portion of the waste water flowing through the tail piece automatically into the branch portion 24 and tube 44 to a floor drain trap. A screen 48 is positioned over the inner end of tubular branch portion 24 to prevent food particles or other foreign materials from entering conduit 26 or tubular branch portion 24.

It will be noted from a consideration of FIG. 2 that, when the tail piece is rotated downwardly for use as a trap primer, tubular branch portion 24 extends at an angle of approximately 60° to main tubular portion 14. As shown in FIG. 1, when tubular branch portion 24 is raised upwardly at an angle of approximately 60° to main tubular portion 14, it may be connected to a tube 50 for receiving drainage from an appliance such as a refrigerator, ice machine, steam table, dishwasher, etc. As further noted from a consideration of FIG. 4, when in the upwardly inclined position, the beveled inner end of tubular branch portion 24 is approximately flush to the inner wall of tubular main portion 14.

In this form of the invention, therefore, a simple and economic universal tail piece is provided which is selectively useable for automatically diverting a portion of the waste water flowing through the tail piece to a drain trap, or for feeding drain water from an appliance through the tail piece to a waste pipe.

In the form of invention illustrated in FIG. 5, there is provided a tail piece generally designated 52 having a main tubular portion 54 having an upper end 56 and a lower end 58 for connection to a waste pipe by suitable fittings 60.

In accordance with this form of the invention, there is provided a first branch portion 62 of tubular confirmation, having a central conduit 64 which is coextensive with the tubular branch portion. Branch portion 62 is fixedly engaged with main tubular portion 54 and extends downwardly at an angle at approximately 45° to the latter, the upper portion of the tubular branch portion extending inwardly of main tubular portion 54 to form a scoop, so that waste water flowing through the tail piece is automatically and positively diverted into conduit 64.

The outer end of tubular branch portion 62 is threaded at 66 for engagement with a hex nut 68 to which a tubular member may be connected for directing waste water to a floor drain trap for priming the latter. A screen 70 is placed over the upper end of conduit 64 to prevent large particles from entering tubular branch portion 62.

A second tubular branch portion 72 of tubular conformation, having a central conduit 74, is fixedly connected to main tubular portion 54, and extends upwardly at an angle of approximately 45° to the latter, the inner end of the branch portion being substantially flush with the inner wall of main tubular portion 54. The outer end of tubular branch portion 72 is threaded at 76 for engagement with a hex nut 78 to which a tubular member may be connected for draining water or the like from appliances into tail piece 52.

In this form of the invention, one or both of the tubular branches may be utilized at the same time, if desired. In the event that one of the tubular branches is not in use, hex nuts 68 and 78 may be replaced by caps.

The tail piece of the present invention is universal in nature, having greater flexibility, versatility, and multiplicity of uses than heretofore provided. The present tail piece is of simple, economic construction, which may be readily installed and replaced, or which when installed, may be readily adapted for another use without removal of the tail piece from the waste pipe.

While there has been herein shown and described the presently preferred forms of this invention, it is to be understood that such has been done for purposes of illustration only, and that various changes may be made therein within the scope of the appended claims.

What is claimed is:

1. A universal tail piece for insertion in a waste pipe of a water drainage system readily adjustable for multiple uses including channeling a portion of the waste water from a primary source to a floor drain trap for priming the same and for draining waste water from a secondary source through the waste pipe along with the waste water from the primary source being drained, comprising
   (a) a main tubular portion adapted to be connected to a waste pipe in a substantially vertical position, and including an upper inlet having means for connecting to a waste pipe, a bottom outlet having means for connecting to a floor drain trap, and a main conduit coextensive with the length of the main tubular portion through which the waste water passes;
   (b) a tubular boss operatively connected to said main tubular portion;
   (c) a secondary conduit disposed within said tubular boss;
   (d) said secondary conduit having first and second ends, said first end being in communication with said main conduit, and
   (e) means for selectively adjusting said secondary conduit between first and second operating locations;
   (f) said first end of said secondary conduit extending inwardly only a portion of said main conduit, and directed toward said upper inlet when in the first operating location, for channeling only a portion of the waste water from the primary source to a floor drain trap for priming the same;
   (g) said first end of said secondary conduit, when in said second operating location, being directed toward said bottom outlet, and operable for channeling waste water from a secondary source through the waste pipe along with the waste water from the primary source being drained;
   (h) said second end of said secondary conduit, when said secondary conduit is in said first operating location, assuming a position in spaced relation to the position said second end assumes when said secondary conduit is in said second operating location.

2. The tail piece of claim 1, wherein:
   (a) said means for adjusting said secondary conduit includes a universal joint for swivelly connecting said secondary conduit to said main tubular portion.

3. The tail piece of claim 2, wherein:
   (a) said universal joint includes a ball having a bore passing substantially diametrically therethrough; and
   (b) said secondary conduit extending through said bore and fixedly engaged with said ball.

4. The tail piece of claim 3, wherein:
   (a) said tubular boss includes at least a first recess formed therein for providing an operably associated socket for said ball.

5. The tail piece of claim 3, wherein:
   (a) said tubular boss includes a central bore formed therein communicating with said main conduit of said main tubular portion;
   (b) said central bore includes first and second portions;

(c) said first portion being adjacent said main conduit and having a diameter less than said second portion.

6. The tail piece of claim 5, wherein:
(a) said central bore includes an arcuate portion intermediate said first and second portions for forming at least a portion of a socket operably associated with said ball.

7. The tail piece of claim 6, wherein:
(a) means are engaged with said outer end of said tubular boss for sealing the same; and
(b) said means for sealing includes a seal having an arcuate portion formed therein and operably associated with said ball for forming at least a portion of a socket operably associated with said ball for permitting rotational movement of said ball while preventing lateral movement thereof.

8. The tail piece of claim 7, wherein:
(a) said means for sealing includes a locking nut threadably engaged with the outer end of said tubular boss.

9. The tail piece of claim 1, wherein:
(a) said end of said secondary conduit communicating with said main conduit being beveled upwardly and inwardly, whereby, when said secondary conduit is positioned downwardly at an angle to said main tubular portion, said beveled end thereof functions as a scoop which extends into only a portion of said main tubular portion for diverting a part of the waste water flowing through the main tubular portion into said secondary conduit.

10. The tail piece of claim 1, wherein:
(a) said tubular boss extends outwardly from said main tubular portion forming a substantially right angle.

11. The tail piece of claim 1, wherein:
(a) said main tubular portion and said tubular boss are formed from a single piece.

12. The tail piece of claim 1, wherein:
(a) said secondary conduit at the end opposite of said one end communicating with said main conduit having means associated therewith for securing a tubular member to said secondary conduit.

* * * * *